United States Patent
Lee et al.

(10) Patent No.: US 11,063,389 B2
(45) Date of Patent: Jul. 13, 2021

(54) CONNECTOR STRUCTURE AND DISPLAY PANEL DEVICE HAVING CONNECTOR STRUCTURE

(71) Applicant: E Ink Holdings Inc., Hsinchu (TW)

(72) Inventors: Huei-Chuan Lee, Hsinchu (TW); Yen-Ze Huang, Hsinchu (TW); Chih-Chun Chen, Hsinchu (TW); Chin-Chi Yu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 14 days.

(21) Appl. No.: 16/691,573

(22) Filed: Nov. 21, 2019

(65) Prior Publication Data
US 2020/0169033 A1 May 28, 2020

(30) Foreign Application Priority Data
Nov. 23, 2018 (TW) .................................. 107141939

(51) Int. Cl.
*H01R 13/62* (2006.01)
*G09F 9/30* (2006.01)
*G09G 5/00* (2006.01)

(52) U.S. Cl.
CPC .............. *H01R 13/62* (2013.01); *G09F 9/30* (2013.01); *G09G 5/006* (2013.01)

(58) Field of Classification Search
CPC ...... H01R 35/04; H01R 11/30; H01R 13/514; H01R 13/56; H01R 13/6205;
(Continued)

(56) References Cited

U.S. PATENT DOCUMENTS 4,603,068 A 7/1986 Hunter
4,746,297 A * 5/1988 Soleau .................... F16G 11/04
439/8
(Continued)

FOREIGN PATENT DOCUMENTS

CN 107368151 A 11/2017
CN 206820229 U 12/2017
(Continued)

OTHER PUBLICATIONS

Corresponding Chinese office action dated Nov. 23, 2020.
Corresponding Taiwan office action dated Jul. 19, 2019.

*Primary Examiner* — Edwin A. Leon
*Assistant Examiner* — Matthew T Dzierzynski
(74) *Attorney, Agent, or Firm* — CKC & Partners Co., LLC

(57) ABSTRACT

A connector structure includes a first connector and a second connector configured to rotatably connect the first connector. The first connector includes an insulating support, a first conductor and a second conductor. The first and second conductors respectively include first and second convex curved surfaces. The second connector includes first and second insulating housings and first and second conductive layers. The first and second insulating housings are configured to cover at least a portion of the first conductor and at least a portion of the second conductor, respectively. The first conductive layer includes a first concave curved surface matching the first convex curved surface, and is configured to be in contact with the first conductor. The second conductive layer includes a second concave curved surface matching the second convex curved surface, and is configured to be in contact with the second conductor.

11 Claims, 8 Drawing Sheets

(58) Field of Classification Search
CPC .......... H01R 13/6658; H01R 2201/06; H01R 25/147; H01R 35/00; H01R 39/64; H01R 39/643; H01R 43/00; H01R 43/16
See application file for complete search history.

(56) References Cited

U.S. PATENT DOCUMENTS

| | | | | |
|---|---|---|---|---|
| 4,978,306 | A * | 12/1990 | Robb | H01R 35/04 |
| | | | | 439/592 |
| 6,183,263 | B1 * | 2/2001 | Tacchi | D06F 75/28 |
| | | | | 439/17 |
| 7,854,614 | B2 * | 12/2010 | Robb | H01R 35/04 |
| | | | | 439/8 |
| 7,864,514 | B2 * | 1/2011 | Lee | F16M 11/10 |
| | | | | 361/679.21 |
| 8,157,409 | B2 | 4/2012 | Sim | |
| 8,376,756 | B2 * | 2/2013 | Robb | H01R 43/16 |
| | | | | 439/8 |
| 9,300,099 | B2 * | 3/2016 | Moscovitch | G06F 1/1601 |
| 9,546,675 | B2 | 1/2017 | Evitt | |
| 10,367,296 | B2 * | 7/2019 | Chan | H01R 25/147 |
| 2011/0081788 | A1 | 4/2011 | Robb | |
| 2013/0009852 | A1 | 1/2013 | Moscovitch | |
| 2020/0096947 | A1 * | 3/2020 | Thomas | G06F 1/1681 |

FOREIGN PATENT DOCUMENTS

| | | |
|---|---|---|
| CN | 206834413 U | 1/2018 |
| TW | 200801663 A | 1/2008 |
| TW | M501716 U | 5/2015 |

\* cited by examiner

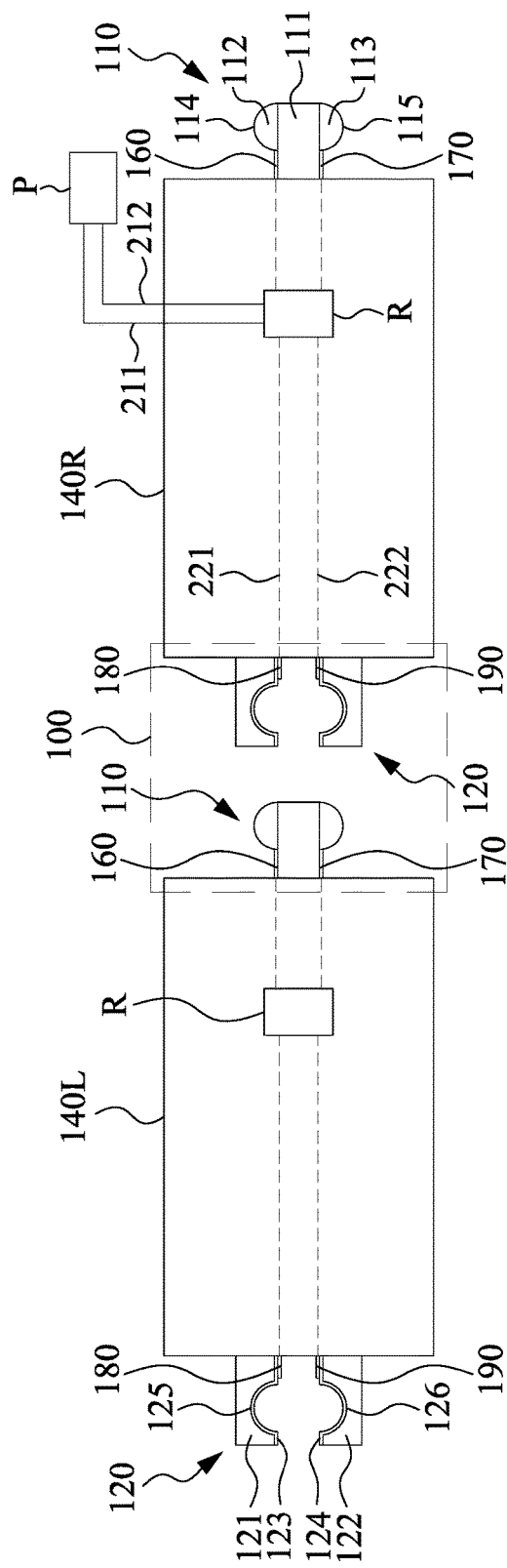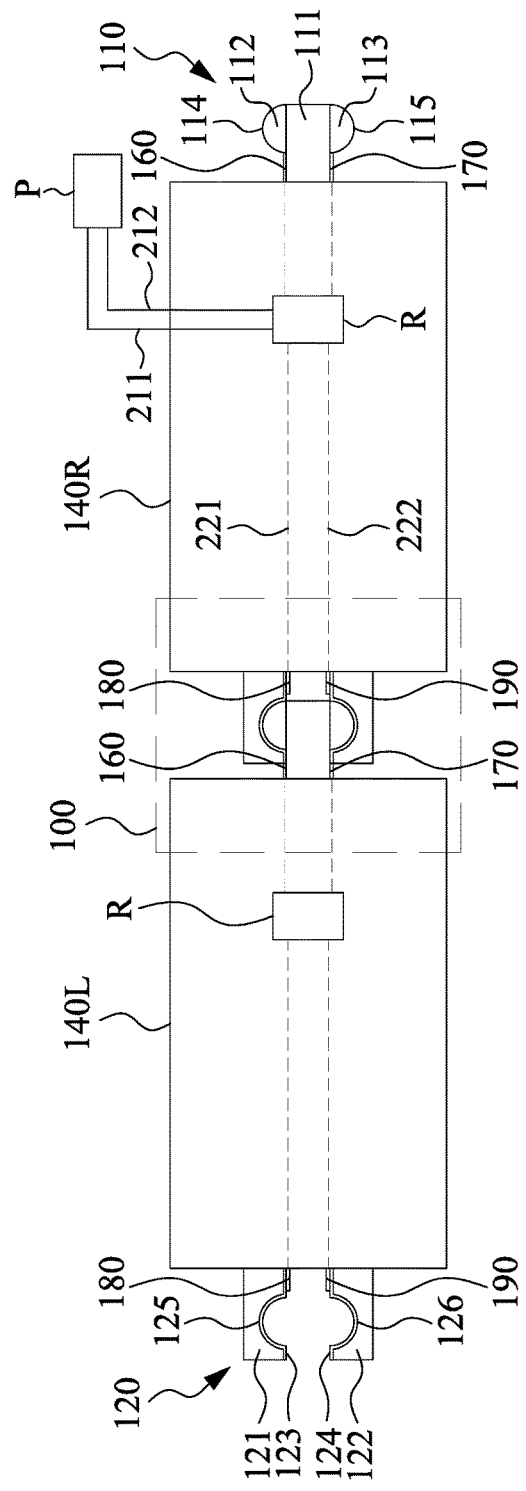

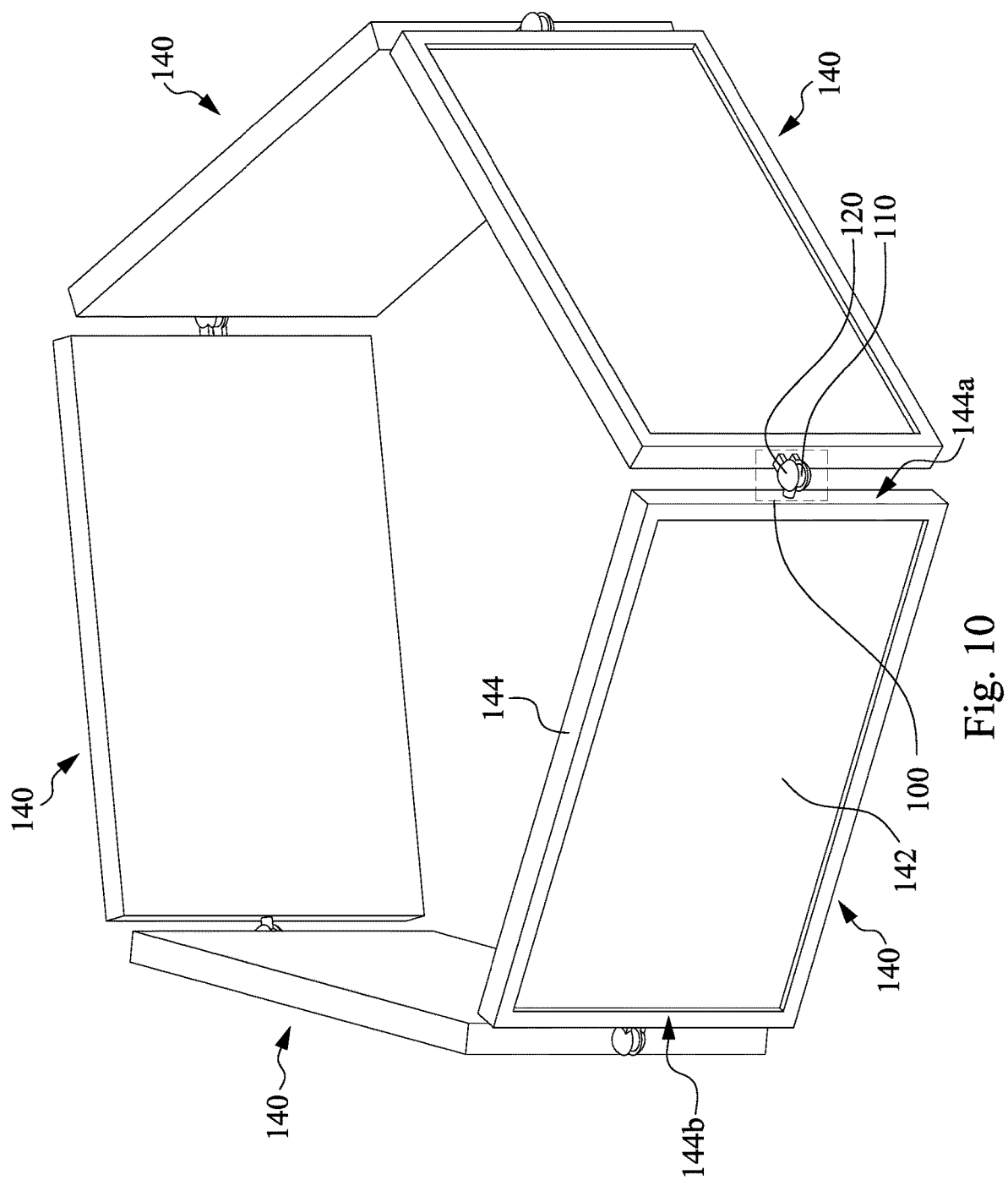

US 11,063,389 B2

CONNECTOR STRUCTURE AND DISPLAY PANEL DEVICE HAVING CONNECTOR STRUCTURE

CROSS-REFERENCE TO RELATED APPLICATION

This application claims priority to Taiwan Application Serial Number 107141939, filed Nov. 23, 2018, which is herein incorporated by reference.

BACKGROUND

Field of Invention

Embodiments of the present disclosure relates to a connector structure and a display panel device having the connector structure, and more particularly to a connector structure capable of providing power signals.

Description of Related Art

Currently, a large advertising billboard (e.g., a video wall) is constituted by connecting several televisions or displays to form a large display device. Since job links and circuitry of each television or display are operated separately, an external circuit is used to transmit power and data signals between each television or display. However, the above-mentioned external circuit is disadvantageous to the operation of circuit replacement and detection of the display device, and intricately arranged wires also affect overall visual feeling of the display device.

SUMMARY

In view of the above-mentioned shortcomings of the prior art, the embodiments of the present disclosure provides a connection structure that can provide power signals. In addition, the connection structure can provide non-planar stable connection between displays.

In one embodiment of the present disclosure, a connector structure is provided, which includes a first connector and a second connector configured to rotatably connect the first connector. The first connector includes an insulating support, a first conductor and a second conductor. The first and second conductors respectively disposed at two opposite sides of the insulating support, in which the first and second conductors respectively have first and second convex curved surfaces, and the first and second convex curved surfaces protrude from the insulating support. The second connector includes a first insulating housing, a second insulating housing, a first conductive layer disposed at an inner surface of the first insulating housing and a second conductive layer disposed at an inner surface of the second insulating housing. The first and second insulating housings are configured to cover at least a portion of the first conductor and at least a portion of the second conductor, respectively. The first conductive layer includes a first concave curved surface matching the first convex curved surface, and is configured to be in contact with the first conductor. The second conductive layer includes a second concave curved surface matching the second convex curved surface, and is configured to be in contact with the second conductor.

In one embodiment of the present disclosure, the first and second conductors are elastically connected to the insulating support, so that the first and second conductors are able to be buried in the insulating support.

In one embodiment of the present disclosure, the first conductor includes a first rounded body and a plurality of first curved bumps, and the first curved bumps protrude from the first rounded body. The second conductor includes a second rounded body and a plurality of second curved bumps, and the second curved bumps protrude from the second rounded body.

In one embodiment of the present disclosure, the first concave curved surface includes a first rounded curved surface and a plurality of first recesses, and the first recesses are recessed from the first rounded curved surface toward the first insulating housing; the second concave curved surface includes a second rounded curved surface and a plurality of second recesses, and the second recesses are recessed from the second rounded curved surface toward the second insulating housing. The first rounded body and the first curved bumps are respectively configured to match the first rounded curved surface and the second recesses, and the second rounded body and the second curved bumps are respectively configured to match the second rounded curved surface and the second recesses.

In one embodiment of the present disclosure, the first connector further includes a first wire and a second wire electrically connected to the first conductor and the second conductor, respectively; and the second connector further includes a third wire and a fourth wire electrically connected to the first conductive layer and the second conductive layer, respectively.

In one embodiment of the present disclosure, when the second connector rotatably connects the first connector, the first wire, the first conductor, the first conductive layer and the third wire form a first conductive path, and the second wire, the second conductor, the second conductive layer and the fourth wire form a second conductive path.

In another embodiment of the present disclosure, a connector structure is provided, which includes a core connector and a housing connector configured to rotatably connect the core connector. The core connector includes a connector, a rounded insulating core body disposed at one end of the connector, a plurality of conductive bumps protruding from the rounded insulating core body, and a plurality of first wires, in which the first wires connect the conductive bumps from the connector through the rounded insulating core body. The housing connector includes an insulating housing, a plurality of concave conductive members and a plurality of second wires connecting the concave conductive members. The insulating housing is configured to cover at least a portion of the rounded insulating core body, and the insulating housing has an inner curved surface and a plurality of recesses formed over the inner curved surface. The concave conductive members are disposed in the recesses, and the concave conductive members have concave surfaces. The concave surfaces are configured to engage the conductive bumps. Each of the second wires connects one of the concave conductive members.

In further embodiment of the present disclosure, a connector structure is provided, which includes a first connector and a second connector configured to rotatably connect the first connector. The first connector includes an insulating support, a first conductive member and a second conductive member. The insulating support has a first rounded recess and a second rounded recess respectively disposed at two opposite sides of the insulating support. The first conductive member and a second conductive member are respectively disposed at the first rounded recess and the second rounded recess. The second connector includes a first insulating support, a first conductor disposed over the first insulating support, a second insulating support relative to the first insulating support, and a second conductor disposed over the second insulating support. The first conductor has a first rounded convex surface. The second conductor has a second rounded convex surface. The first rounded convex surface is opposite to the second rounded convex surface. The first and second rounded convex surfaces are respectively configured to engage the first and second rounded recesses and to be in contact with the first and second conductive members.

In further embodiment of the present disclosure, the first connector further includes a first wire and a second wire electrically connected to the first conductive member and the second conductive member, respectively; and the second connector further includes a third wire and a fourth wire electrically connected to the first conductor and the second conductor, respectively.

In further embodiment of the present disclosure, when the second connector rotatably connects the first connector, the first wire, the first conductive member, the first conductor and the third wire form a first conductive path, and the second wire, the second conductive member, the second conductor and the fourth wire form a second conductive path.

In further embodiment of the present disclosure, a display panel device having a connector structure is provided, which includes a display panel, a frame, a first connector and a second connector. The frame is configured to accommodate the display panel, and the frame has a first side and a second side corresponding to each other. The first connector is disposed at the first side of the frame. The first connector includes an insulating support, a first conductive member and a second conductive member. The second connector is disposed at the second side of the frame. The second connector includes an insulating housing, a first conductive layer at an inner surface of the insulating housing, and a second conductive layer at another inner surface of the insulating housing.

The above description will be described in detail in the following embodiments, and further explanation of the technical solutions of the disclosure will be provided.

BRIEF DESCRIPTION OF THE DRAWINGS

The invention can be more fully understood by reading the following detailed description of the embodiment, with reference made to the accompanying drawings as follows:

FIG. 1 is a plan view of a connector structure of a first embodiment when it is not connected;

FIG. 2 is a plan view of the connector structure of the first embodiment after the connection;

FIGS. 9 and 10 are perspective views of display panel devices having the connector structures of the present disclosure.

DETAILED DESCRIPTION

Figure 3:
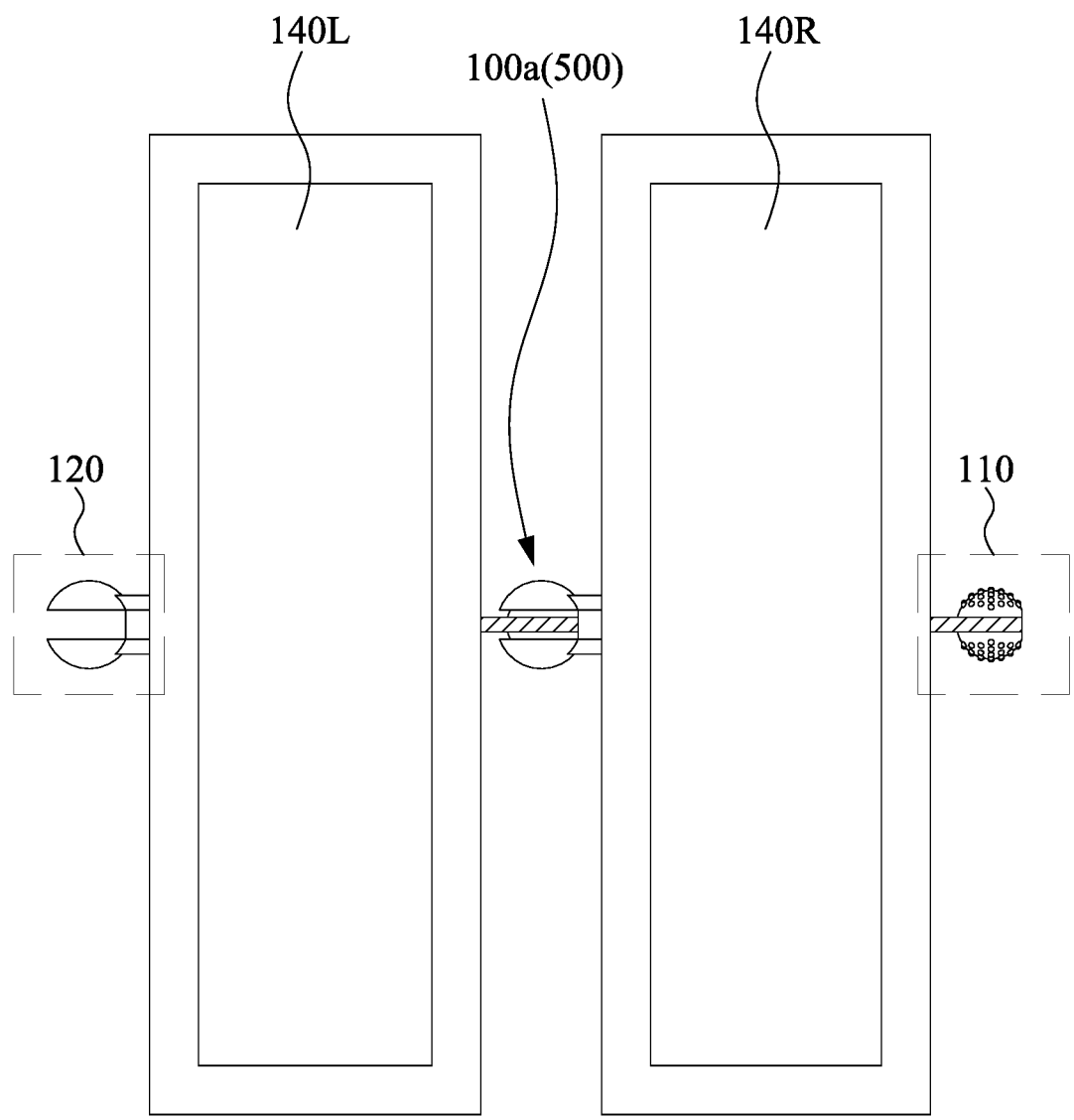
FIG. 3 is a top view of a connector structure of a second embodiment of the present disclosure.

In order that the present disclosure is described in detail and completeness, implementation aspects and specific embodiments of the present disclosure with illustrative description are presented; but it is not the only form for implementation or use of the specific embodiments. The embodiments disclosed herein may be combined or substituted with each other in an advantageous manner, and other embodiments may be added to an embodiment without further description.

Spatially relative terms, such as "beneath," "below," "over," "on," and the like, may be used herein for ease to describe one element or feature's relationship to another element(s) or feature(s) as illustrated in the figures. The true meaning of the spatially relative terms includes other orientations. For example, when the figure is flipped up and down by 180 degrees, the relationship between one element and another element may change from "beneath," "below," to "over," "on." In addition, the spatially relative descriptions used herein should be interpreted the same.

In the following description, numerous specific details are described in detail to provide a thorough understanding of the following embodiments. However, the embodiments of the present disclosure may be practiced without specific details. The same element symbols identify similar elements or actions. In other instances, well-known structures and devices are only schematically depicted in the drawings to simplify the drawings. The terms "about", "approximately", "substantially" or "essentially" as used herein generally mean that the error or range of the numerical value is within about 20%, preferably within about 10%. More preferably, it is within about 5%. Unless otherwise stated, the numerical values are referred to approximations, that is, the errors or ranges indicated by "about", "approximately", "substantially" or "essentially."

Referring to both FIG. 1 and FIG. 2, FIG. 1 is a plan view of a connector structure 100 of a first embodiment when it is not connected, and FIG. 2 is a plan view of the connector structure 100 of the first embodiment after the connection. The connector structure 100 includes a first connector 110 and a second connector 120. The first connector 110 includes an insulating support 111, a first conductor 112, and a second conductor 113. The first conductor 112 and the second conductor 113 are respectively disposed at two opposite sides of the insulating support 111 and respectively have a first convex curved surface 114 and a second convex curved surface 115. The first convex curved surface 114 and the second convex curved surface 115 protrude from the insulating support 111. In some embodiments, the insulating support 111 may include various polymeric materials such as polyurethane, acrylate, methacrylate, epoxy, polycarbonate, polyethylene or polystyrene or other suitable insulating polymeric materials. In some embodiments, the first conductor 112 and the second conductor 113 may be formed using metal or alloy or a suitable material that may form a conductive function. In a preferred embodiment, the first conductor 112 and the second conductor 113 are elastically connected to the insulating support 111 such that the first conductor 112 and the second conductor 113 can be buried in the insulating support 111. For example, the first connector 110 may further include two springs (not shown) disposed in the insulating support 111. The first conductor 112 (e.g., a steel ball) is connected to one of the springs, and the second conductor 113 (e.g., a steel ball) is connected to the other spring, so that the first conductor 112 and the second conductor 113 can elastically connect the insulating support 111. When the first conductor 112 and the second conductor 113 are pressed by an external force, the first conductor 112 and the second conductor 113 may be buried in the insulating support 111. However, when the external force disappears, the first conductor 112 and the second conductor 113 return to the original positions due to the elastic forces of the springs. In addition, the first connector 110 also includes a first wire 160 and a second wire 170 electrically connected to the first conductor 112 and the second conductor 113, respectively. In some embodiments, the first wire 160 and the second wire 170 may be made of copper metal or other metal material having low electrical resistance.

The second connector 120 includes a first insulating housing 121, a second insulating housing 122, a first conductive layer 123, and a second conductive layer 124. The first insulating housing 121 and the second insulating housing 122 are respectively configured to cover all or at least a portion of the first conductor 112 and all or at least a portion of the second conductor 113. The first conductive layer 123 is disposed over an inner surface of the first insulating housing 121, and the first conductive layer 123 includes a first concave curved surface 125 matching the first convex curved surface 114 and is configured to be in contact with the first conductor 112. Similarly, the second conductive layer 124 is disposed over an inner surface of the second insulating housing 122, and the second conductive layer 124 includes a second concave curved surface 126 matching the second convex curved surface 115 and is configured to be in contact with the second conductor 113. In some embodiments, the first conductive layer 123 and the second conductive layer 124 may be formed using metal or alloy or a suitable material that can form a conductive function. In some embodiments, the first insulating housing 121 and the second insulating housing 122 may be an integrally formed housing, and it may include various polymeric materials such as polyurethane, acrylate, methacrylate, epoxy, polycarbonate, polyethylene or polystyrene or other suitable insulating polymeric materials. In addition, the second connector 120 also includes a third wire 180 and a fourth wire 190 electrically connected to the first conductive layer 123 and the second conductive layer 124, respectively. In some embodiments, the third wire 180 and the fourth wire 180 may be made of copper metal or other metal material having low electrical resistance.

Referring to FIG. 2, when the second connector 120 connects the first connector 110, the first conductor 112 and the second conductor 113 are firstly pressed by the second connector 120 and then buried in the insulating support 111. However, when the first conductor 112 and the second conductor 113 are moved to positions of the first concave curved surface 125 and the second concave curved surface 126, respectively, the first conductor 112 and the second conductor 113 are returned to the original positions and in contact with the first conductive layer 123 and the second conductive layer 124, respectively. In another embodiment, the first insulating housing 121 and the second insulating housing 122 themselves may be a resilient housing, such that when the second connector 120 is connected to the first connector 110, the first connector 110 can successfully engage the second connector 120, and the first conductor 112 and the second conductor 113 are in contact with the first conductive layer 123 and the second conductive layer 124, respectively.

Further, when the second connector 120 connects the first connector 110, the first wire 160, the first conductor 112, the first conductive layer 123, and the third wire 180 form a first conductive path, and the second wire 170, the second conductor 113, the second conductive layer 124, and the fourth wire 190 form a second conductive path. When a power rectifier plate R of a display 140R is electrically connected to an external power supply P, two poles of the power supply P may respectively connect the first conductive path and the second conductive path via the power rectifier plate R. Therefore, the electric energy transmitted to a display 140L is transmitted to a display 140L via the connector structure 100. Specifically, one pole of the power supply P may be connected to the power rectifier plate R via a wire 211, and the power rectifier plate R is then connected to the third wire 180 of the second connector 120 via a wire 221. Similarly, the other pole of the power supply P may be connected to the power rectifier plate R via a wire 212, and the power rectifier plate R is then connected to the fourth wire 190 of the second connector 120 via a wire 222.

It is noted that the connector structure 100 disclosed herein provides not only electrical connection but also mechanical connection. Since the first concave curved surface 125 of the first conductive layer 123 matches the first convex curved surface 114 of the first conductor 112, and the second concave curved surface 126 of the second conductive layer 124 matches the second convex curved surface 115 of the second conductor 113, the second connector 120 and the first connector 110 are able to rotate relative to each other. That is, the second connector 120 is able to rotatably connect the first connector 110. For example, the first convex curved surface 114 and the second convex curved surface 115 may be convex hemispherical surfaces, and the first concave curved surface 125 and the second concave curved surface 126 may be concave hemispherical surfaces, so that the second connector 120 and the first connector 110 are able to rotate relative to each other. In other words, the display 140R and the display 140L are able to rotate relative to each other due to the connection of the connector structure 100.

Figure 4:
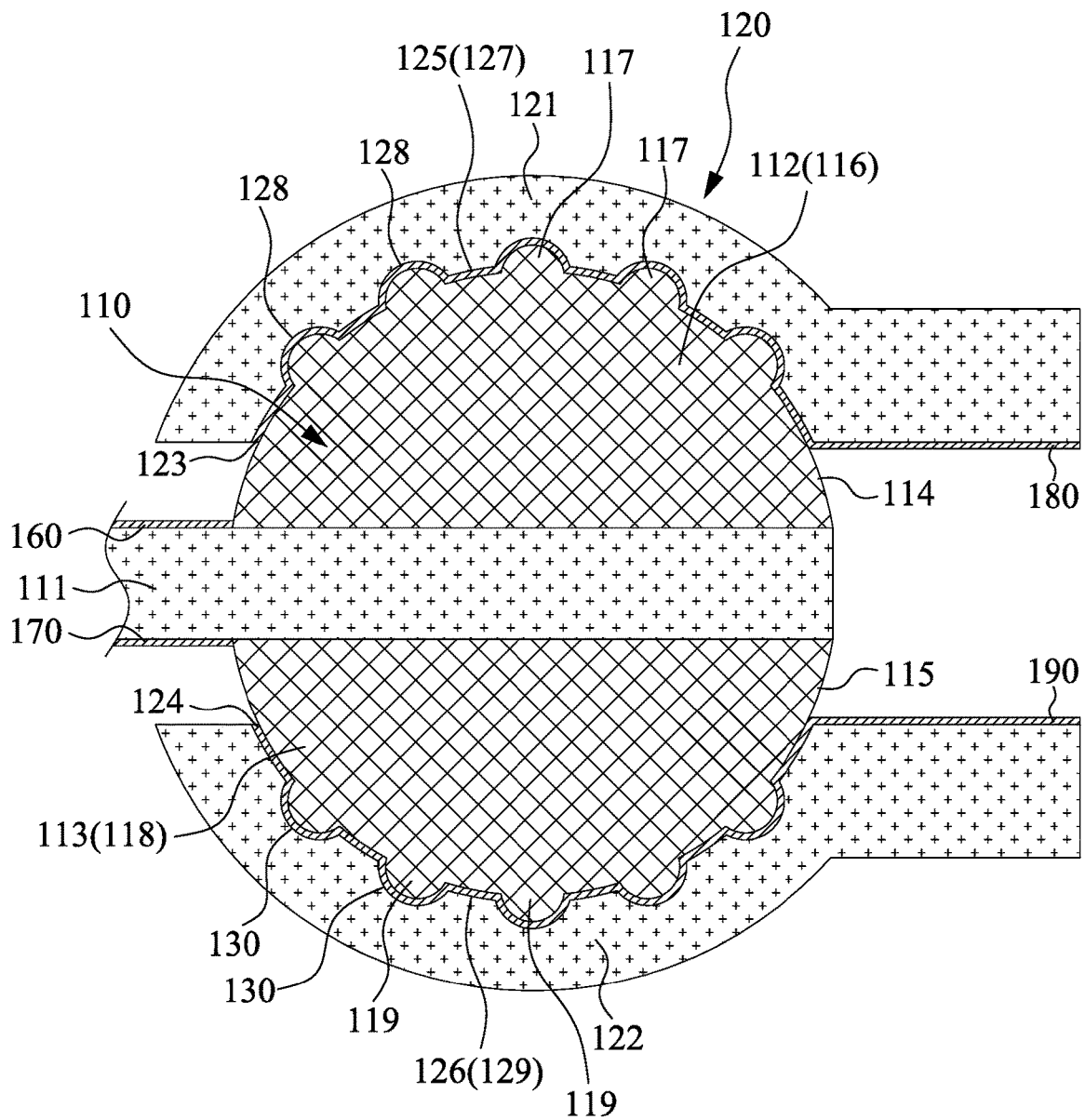
FIG. 4 is a cross-sectional view of the connector structure of the second embodiment of the present disclosure.

Referring to FIG. 3 and FIG. 4 simultaneously, FIG. 3 is a top view of a connector structure 100a of a second embodiment of the present disclosure, and FIG. 4 is a cross-sectional view of the connector structure 100a of the second embodiment of the present disclosure. In the second embodiment, the connector structure 100a includes a first connector 110 and a second connector 120. The first connector 110 includes an insulating support 111, a first conductor 112, and a second conductor 113. The first conductor 112 and the second conductor 113 are disposed at two opposite sides of the insulating support 111. The difference between the first connector 110 of the second embodiment and that of the first embodiment is that the first conductor 112 and the second conductor 113 are different in type. Specifically, the first conductor 112 of the first connector 110 of the second embodiment includes a first rounded body 116 and a plurality of first curved bumps 117 protruding from the first rounded body 116. In addition, the second conductor 113 includes a second rounded body 118 and a plurality of second curved bumps 119 protruding from the second rounded body 118. Other technical features and examples of the first connector 110 of the second embodiment may be the same as any of the embodiments or examples of the first connector described above with respect to the first embodiment.

The second connector 120 of the second embodiment includes a first insulating housing 121, a second insulating housing 122, a first conductive layer 123, and a second conductive layer 124. The difference between the second connector 120 of the second embodiment and that of the first embodiment is that the first conductive layer 123 and the second conductive layer 124 are different in type. Specifically, the first concave curved surface 125 of the first conductive layer 123 of the second embodiment includes a first rounded curved surface 127 and a plurality of first recesses 128, and the first recesses 128 are recessed from the first rounded curved surface 127 toward the first insulating housing 121. Furthermore, the second concave curved surface 126 of the second conductive layer 124 includes a second rounded curved surface 129 and a plurality of second recesses 130, and the second recesses 130 are recessed from the second rounded curved surface 129 toward the second insulating housing 122. Other technical features and examples of the second connector 120 of the second embodiment may be the same as any of the embodiments or examples of the first connector described above with respect to the first embodiment.

In view of the above, the first rounded body 116 and the first curved bumps 117 of the connector structure 100a in the second embodiment are configured to match the first rounded curved surface 127 and the first recesses 128, respectively. Moreover, the second rounded body 118 and the second curved bumps 119 are configured to match the second rounded curved surface 129 and the second recesses 130, respectively. The first and second curved bumps 117 and 119 and the first and second recesses 128 and 130 are configured to provide positioning points when the first connector 110 and the second connector 120 are relatively rotated. It should be particularly noted that the total number of the first curved bumps 117 and the second curved bumps 119 may not be equal to the total number of the first recesses 128 and the second recesses 130. For example, the total number of the first recesses 128 and the second recesses 130 may be greater than the total number of the first curved bumps 117 and the second curved bumps 119, and thus when the second connector 120 is rotated relative to the first connector 110, the first recesses 128 and the second recesses 130 can provide sufficient positioning points for the first curved bumps 117 and the second curved bumps 119.

Similarly, when the second connector 120 connects the first connector 110, the first wire 160, the first conductor 112, the first conductive layer 123, and the third wire 180 form a first conductive path, and the second wire 170, the second conductor 113, the second conductive layer 124, and the fourth wire 190 form a second conductive path. The first conductive path and the second conductive path are equipotentially connected to the two power terminals of the display, respectively.

In the embodiments shown in FIGS. 1 to 4, the same or similar reference numerals indicate the same or similar elements, and those skilled in the art can understand that the same or similar elements may be substituted or combined with each other in different embodiments without specific description.

Figure 5:
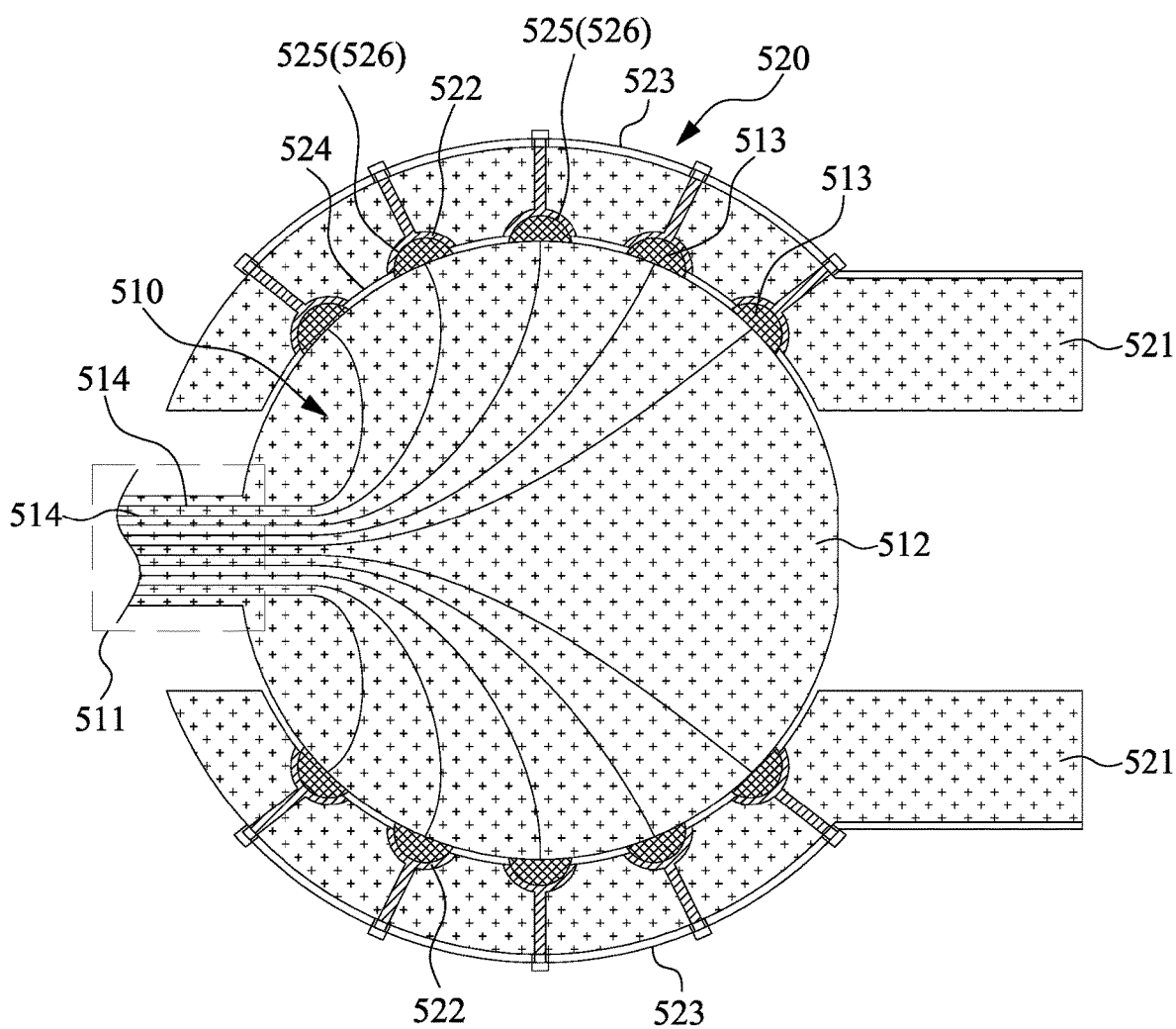
FIG. 5 is a cross-sectional view of a connector structure of a third embodiment of the present disclosure.

FIG. 5 is a cross-sectional view of a connector structure 500 of a third embodiment of the present disclosure. The connector structure 500 includes a core connector 510 and a housing connector 520. The core connector 510 includes a connector 511, a rounded insulating core body 512, a plurality of conductive bumps 513, and a plurality of first wires 514. The rounded insulating core body 512 is disposed at one end of the connector 511. Each of the conductive bumps 513 protrudes from the rounded insulating core body 512. The first wire 514 is substantially equipotentially connected to the conductive bump 513 from the connector 511 through the rounded insulating core body 512. Specifically, each of the first wires 514 is only connected to a single corresponding conductive bump 513. In some embodiments, the connector 511 and the rounded insulating core body 512 may include various polymeric materials such as polyurethane, acrylate, methacrylate, epoxy, polycarbonate, polyethylene, or polystyrene or other suitable insulating polymeric materials. In some embodiments, the conductive bumps 513 may be formed using metal or alloy or a suitable material that can form a conductive function. In some embodiments, the first wire 514 and the second wire 523 may be made of copper metal or other metal material with low electrical resistance.

The housing connector 520 includes an insulating housing 521, a plurality of concave conductive members 522, and a plurality of second wires 523. The insulating housing 521 is configured to cover at least a portion of the rounded insulating core body 512 and has an inner curved surface 524 and a plurality of recesses 525 formed over the inner curved surface 524. The concave conductive member 522 is disposed in the recess 525, and the concave conductive member 522 has a concave surface 526 configured to engage the conductive bump 513. The second wire 523 is configured to substantially equipotentially connect the concave conductive member 522. Specifically, each of the second wires 523 is only electrically connected to a single corresponding concave conductive member 522. In some embodiments, the insulating housing 521 may include various polymeric materials such as polyurethane, acrylate, methacrylate, epoxy, polycarbonate, polyethylene or polystyrene or other suitable insulating polymeric materials. In a preferred embodiment, the insulating housing 521 or the rounded insulating core body 512 is an insulator made of an elastic insulating material, such as epoxy resin, such that the rounded insulating core body 512 or the insulating housing 521 can let the core connector 510 be engaged with the housing connector 520 under pressure deformation. In some embodiments, the concave conductive member 522 may be made of metal or alloy or a suitable material that can form a conductive function. In some embodiments, the outermost periphery of the housing connector 520 may be covered with an insulating protective layer with a suitable thickness to protect the second wires 523 and prevent the second wires 523 from being short-circuited.

When the housing connector 520 is connected to the core connector 510, each of the conductive bumps 513, the corresponding first wire 514, the corresponding concave conductive member 522, and the corresponding second wire 523 forms a conductive path. In other words, the connector structure 500 can provide more than two conductive paths. In an embodiment, when the connector structure 500 replaces the connector structure 100a shown in FIG. 3, each of the first wires 514 may be electrically connected to a corresponding gate line or data line of the display 140L, and each of the second wires 523 may be electrically connected to a corresponding gate line or data line of the display 140R. Therefore, gate signals or data signals of the display 140R may be transmitted to the display 140L through the connector structure 500. It should be particularly noted that the total number of the concave conductive members 522 may not be equal to the total number of the conductive bumps 513. For example, the total number of concave conductive members 522 may be greater than the total number of conductive bumps 513, so that when the housing connector 520 is rotated relative to the core connector 510, the concave conductive members 522 may provide sufficient electrical connection points and positioning points for the conductive bumps 513.

Figure 6:
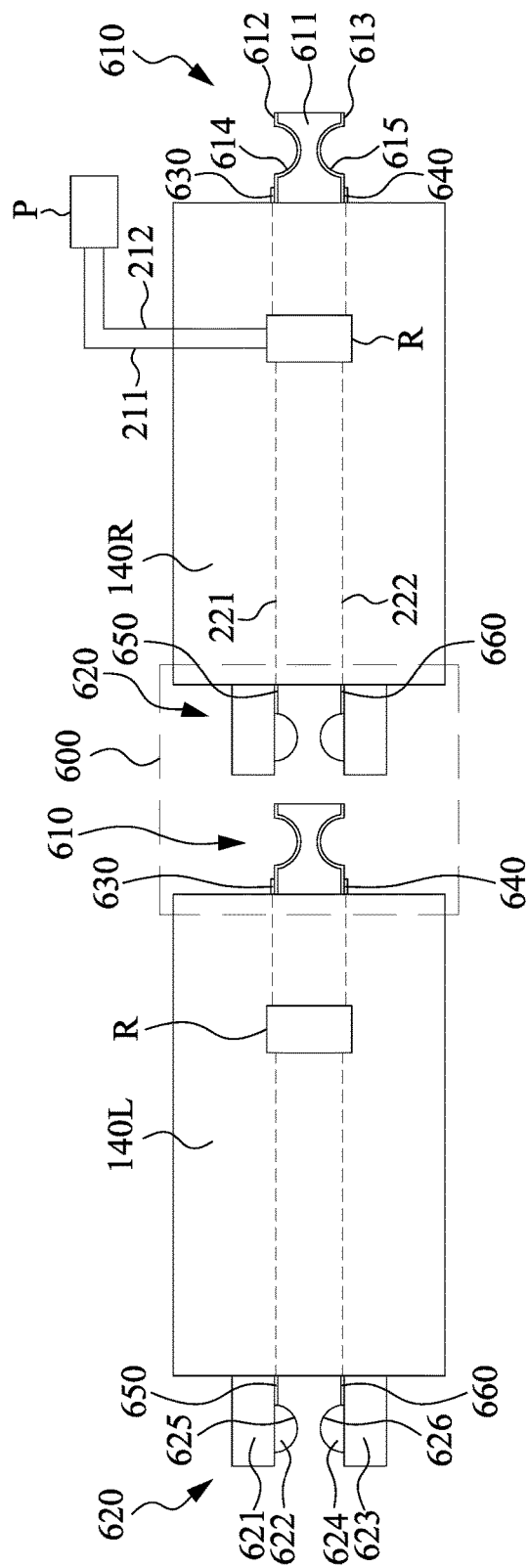
FIG. 6 is a plan view of a connector structure of a fourth embodiment when it is not connected.
Figure 7:
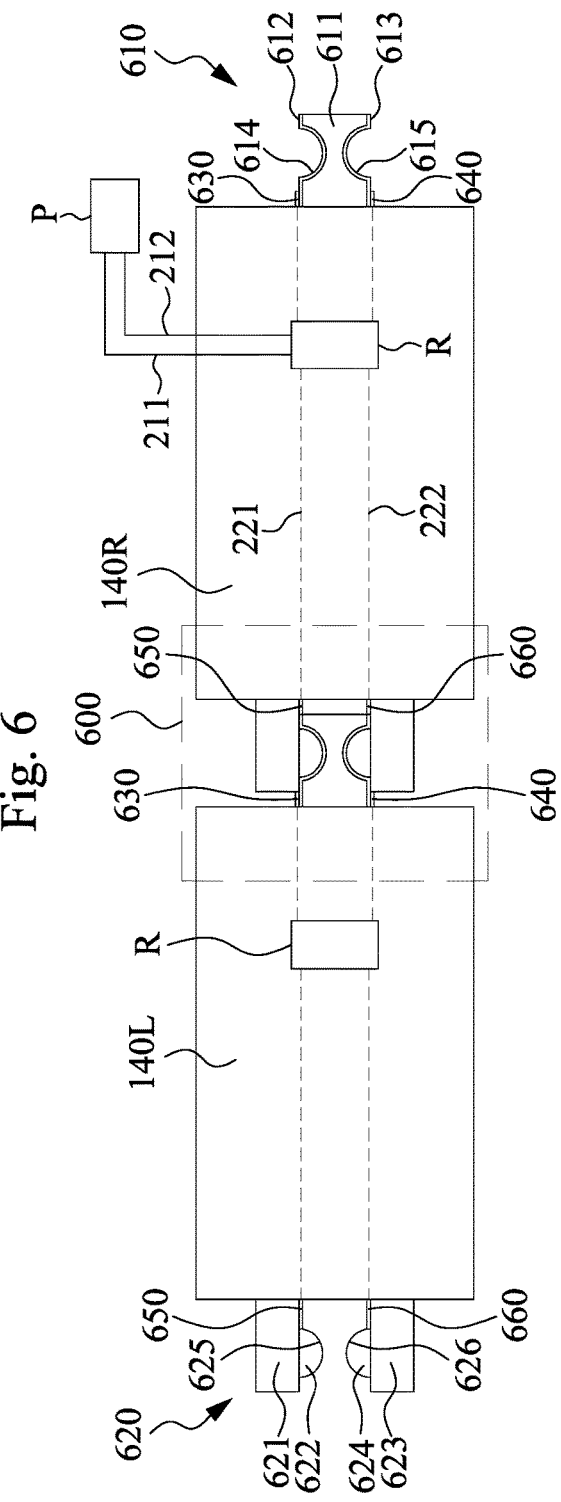
FIG. 7 is a plan view of the connector structure of the fourth embodiment after the connection.

Referring to FIG. 6 and FIG. 7 simultaneously, FIG. 6 is a plan view of a connector structure 600 of a fourth embodiment when it is not connected, and FIG. 7 is a plan view of the connector structure 600 of the fourth embodiment after the connection. The connector structure 600 includes a first connector 610 and a second connector 620. The first connector 610 includes an insulating support 611, a first conductive member 612, and a second conductive member 613. The insulating support 611 has a first rounded recess 614 and a second rounded recess 615 disposed at two opposite sides of the insulating support 611, respectively. The first conductive member 612 and the second conductive member 613 are disposed at the first rounding recess 614 and the second rounding recess 615, respectively. In some embodiments, the insulating support 611 may include various polymeric materials such as polyurethane, acrylate, methacrylate, epoxy, polycarbonate, polyethylene or polystyrene or other suitable insulating polymeric materials. In some embodiments, the first conductive member 612 and the second conductive member 613 may be formed using metal or alloy or a suitable material that can form a conductive function. The first conductive member 612 and the second conductive member 613 may be, for example, conformal metal layers formed over the first rounding recess 614 and the second rounding recess 615, respectively, and thus the first conductive member 612 and the second conductive member 613 respectively have substantially same or similar contours as the first rounded recess 614 and the second rounded recess 615. In other embodiments, the first conductive member 612 and the second conductive member 613 may be, for example, metal rings disposed in the first rounding recess 614 and the second rounding recess 615, respectively. In addition, the first connector 610 also includes a first wire 630 and a second wire 640 electrically connected to the first conductive member 612 and the second conductive member 613, respectively. In some embodiments, the first wire 630 and the second wire 640 may be made of copper metal or other metal material with low electrical resistance.

The second connector 620 includes a first insulating support 621, a first conductor 622, a second insulating support 623, and a second conductor 624. The first conductor 622 is disposed over the first insulating support 621 and has a first rounded convex surface 625. The second insulating support 623 is disposed relative to the first insulating support 621. The second conductor 624 is disposed over the second insulating support 623 and has a second rounded convex surface 626. The first rounded convex surface 625 and the second rounded convex surface 626 are respectively configured to engage the first rounded recess 614 and the second rounded recess 615. Further, the first rounded convex surface 625 and the second rounded convex surface 626 are also configured to be in contact with the first conductive member 612 and the second conductive member 613. In some embodiments, the first insulating support 621 and the second insulating support 623 may include various polymeric materials such as polyurethane, acrylate, methacrylate, epoxy, polycarbonate, polyethylene or polystyrene or other suitable insulating polymeric material. In some embodiments, the first conductor 622 and the second conductor 624 may be formed using metal or alloy or a suitable material that can form a conductive function. In a preferred embodiment, the first conductor 622 and the second conductor 624 are elastically connected to the first insulating support 621 and the second insulating support 623, respectively, so that the first conductor 622 and the second conductor 624 may be buried in the first insulating support 621 and the second insulating support 623, respectively. For example, the second connector 620 may further include two springs (not shown) disposed in the first insulating support 621 and the second insulating support 623, respectively. The first conductor 622 (e.g., a steel ball) connects the spring within the first insulating support 621, and the second conductor 624 (e.g., a steel ball) connects the spring within the second insulating support 623. Therefore, the first conductor 622 and the second conductor 624 can elastically connect the first insulating support 621 and the second insulating support 623, respectively. When the first conductor 622 and the second conductor 624 are pressed by an external force, the first conductor 622 and the second conductor 624 may be buried in the first insulating support 621 and the second insulating support 623, respectively. However, when the external force disappears, the first conductor 622 and the second conductor 624 return to the original positions due to the elastic forces of the springs. In another embodiment, the first insulating support 621 and the second insulating support 623 may also be elastic support members, so that the above effects can also be achieved. In addition, the second connector 620 also includes a third wire 650 and a fourth wire 660 electrically connected to the first conductor 622 and the second conductor 624, respectively. In some embodiments, the third wire 650 and the fourth wire 660 may be made of copper metal or other metal material having low electrical resistance.

Referring to FIG. 7, when the second connector 620 is connected to the first connector 610, the first conductor 622 and the second conductor 624 are firstly squeezed by the first connector 610 and then to be buried in the first insulating support 621 and the second insulating support 623, respectively. However, when the first conductor 622 and the second conductor 624 are moved to positions of the first rounding recess 614 and the second rounding recess 615, respectively, the first conductor 622 and the second conductor 624 are returned to the original positions and in contact with the first conductor 612 and the second conductor 613, respectively. In addition, when the second connector 620 is connected to the first connector 610, the first wire 630, the first conductive member 612, the first conductor 622, and the third wire 650 form a first conductive path, and the second wire 640, the second conductive member 613, the second conductor 624, and the fourth wire 660 form a second conductive path. When the power rectifier plate R of the display 140R is electrically connected to the external power supply P, the two poles of the power supply P may be respectively connected to the first conductive path and the second conductive path through the power rectifier plate R. Therefore, the electric energy transmitted to the display 140R can be transmitted to the display 140L via the connecbesidetor structure 600. Specifically, one pole of the power supply P may be connected to the power rectifier plate R via the wire 211, and the power rectifier plate R is then connected to the third wire 650 of the second connector 620 via the wire 221. Similarly, the other pole of the power supply P may be connected to the power rectifier plate R via the wire 212, and the power rectifier plate R is then connected to the fourth wire 660 of the second connector 620 via the wire 222.

It is noted that the connector structure 600 disclosed herein provides not only electrical connection but also mechanical connection. Since the first rounded recess 614 matches the first rounded convex surface 625 of the first conductor 622, and the second rounded recess 615 matches the second rounded convex surface 626 of the second conductor 624, the second connector 620 and the first connectors 610 are able to rotate relative to each other. That is, the second connector 620 is able to rotatably connect the first connector 610. For example, the first rounded convex surface 625 and the second rounded convex surface 626 may be convex hemispherical surfaces, and the first rounded recess 614 and the second rounded recess 615 may be concave hemispherical surfaces, so that the second connector 620 and the first connector 610 are able to rotate relative to each other. In other words, the display 140R and the display 140L are able to rotate relative to each other due to the connection of the connector structure 600.

Figure 8:
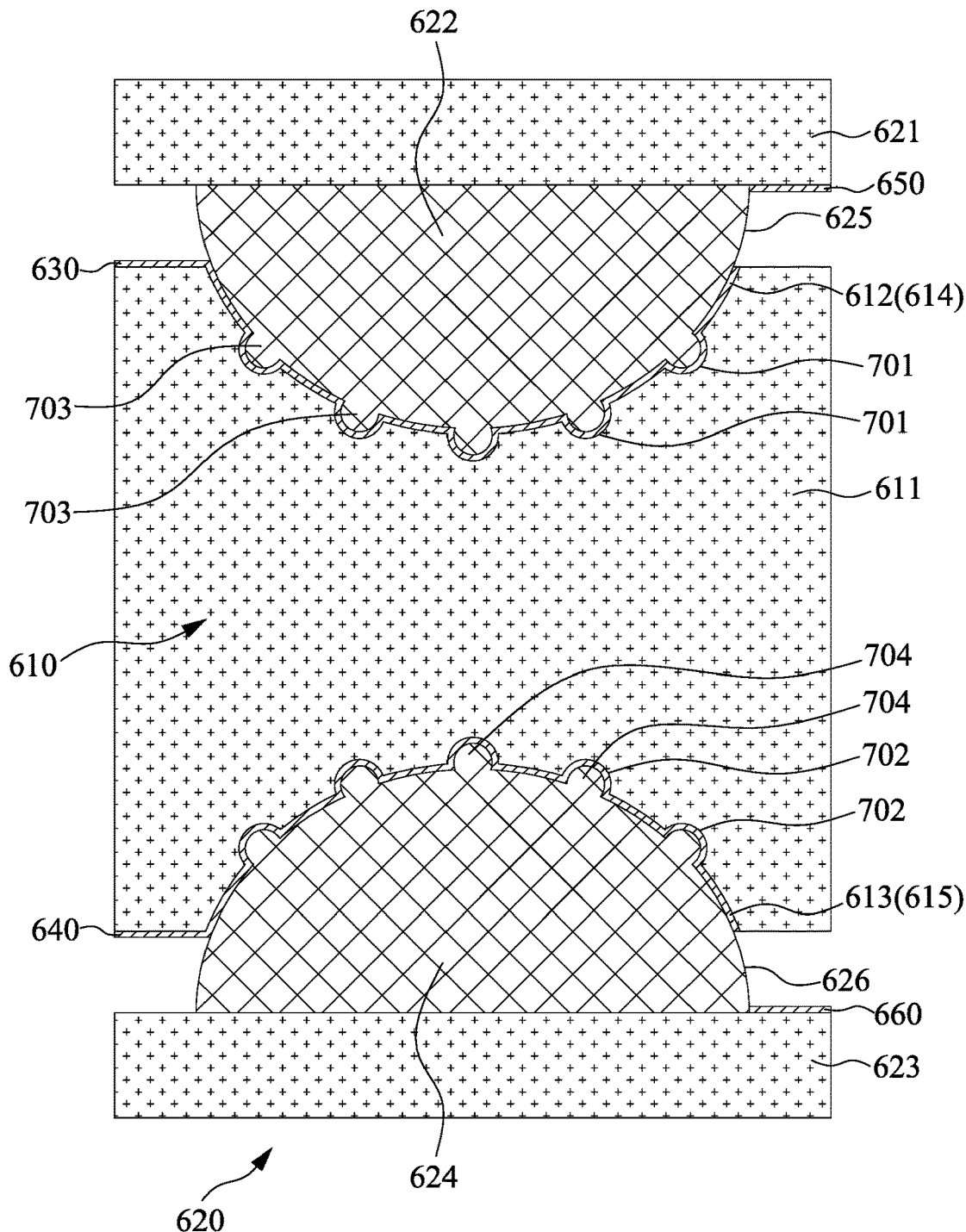
FIG. 8 is a cross-sectional view of a connector structure of a fifth embodiment of the present disclosure.

Referring to FIG. 8, which is a cross-sectional view of a connector structure 600a of a fifth embodiment of the present disclosure, the connector structure 600a includes a first connector 610 and a second connector 620. The first connector 610 includes an insulating support 611, a first conductive member 612, and a second conductive member 613. The insulating support 611 has a first rounded recess 614 and a second rounded recess 615 disposed at two opposite sides of the insulating support 611, respectively. The first conductive member 612 and the second conductive member 613 are disposed at the first rounding recess 614 and the second rounding recess 615, respectively. The first connector 610 of the fifth embodiment is different from that of the fourth embodiment in that the first rounding recess 614 and the second rounding recess 615 are different in type. Specifically, the first rounding recess 614 of the first connector 610 of the fifth embodiment has a plurality of first recesses 701, and each of the first recesses 701 is recessed toward the insulating support 611. Furthermore, the second rounded recess 615 has a plurality of second recesses 702, and each of the second recesses 130 is recessed toward the insulating support 611. Other technical features and examples of the second connector 620 of the fifth embodiment may be the same as any of the embodiments or examples of the first connector described above with respect to the fourth embodiment.

The second connector 620 of the fifth embodiment includes a first insulating support 621, a first conductor 622, a second insulating support 623, and a second conductor 624. The first conductor 622 is disposed over the first insulating support 621 and has a first rounded convex surface 625. The second insulating support 623 is disposed relative to the first insulating support 621. The second conductor 624 is disposed over the second insulating support 623 and has a second rounded convex surface 626. The first rounded convex surface 625 and the second rounded convex surface 626 are respectively configured to engage the first rounded recess 614 and the second rounded recess 615 and to be in contact with the first conductive member 612 and the second conductive member 613. The second connector 620 of the fifth embodiment is different from the fourth embodiment in that the first conductor 622 and the second conductor 624 are different in type. Specifically, the first conductor 622 of the second connector 620 of the fifth embodiment includes a plurality of first curved bumps 703 protruding from the first rounded convex surface 625. In addition, the second conductor 624 includes a plurality of second curved bumps 704 protruding from the second rounded convex surface 626. Other technical features and examples of the second connector 620 of the fifth embodiment may be the same as any of the embodiments or examples of the second connector described above with respect to the fourth embodiment.

In view of the above, the first rounded convex surface 625 and the first curved bumps 703 of the connector structure 600a in the fifth embodiment are configured to match the first rounded recess 614 and the first recesses 701, respectively. Moreover, the second rounded convex surface 626 and the second curved bumps 704 are configured to match the second rounded recess 615 and the second recesses 702, respectively. The first curved bumps 703 and the second curved bumps 704, and the first recesses 701 and the second recesses 702 are configured to provide positioning points when the first connector 610 and the second connector 620 are relatively rotated. It should be particularly noted that the total number of the first curved bumps 703 and the second curved bumps 704 may not be equal to the total number of the first recesses 701 and the second recesses 702. For example, the total number of the first recesses 701 and the second recesses 702 may be greater than the total number of the first curved bumps 703 and the second curved bumps 704, and thus when the second connector 620 is rotated relative to the first connector 610, the first recesses 701 and the second recesses 702 can provide sufficient positioning points for the first curved bumps 703 and the second curved bumps 704.

When the second connector 620 connects the first connector 610, the first wire 630, the first conductive member 612, the first conductor 622, and the third wire 650 form a first conductive path, and the second wire 640, the second conductive member 613, the second conductor 624, and the fourth wire 660 form a second conductive path. The first conductive path and the second conductive path are equipotentially connected to the two power terminals of the display, respectively.

In the embodiments shown in the above FIGS. 6 to 8, the same or similar reference numerals indicate the same or similar elements, and those skilled in the art can understand that the same or similar elements may be substituted or combined with each other in different embodiments without specific description.

Figure 9:
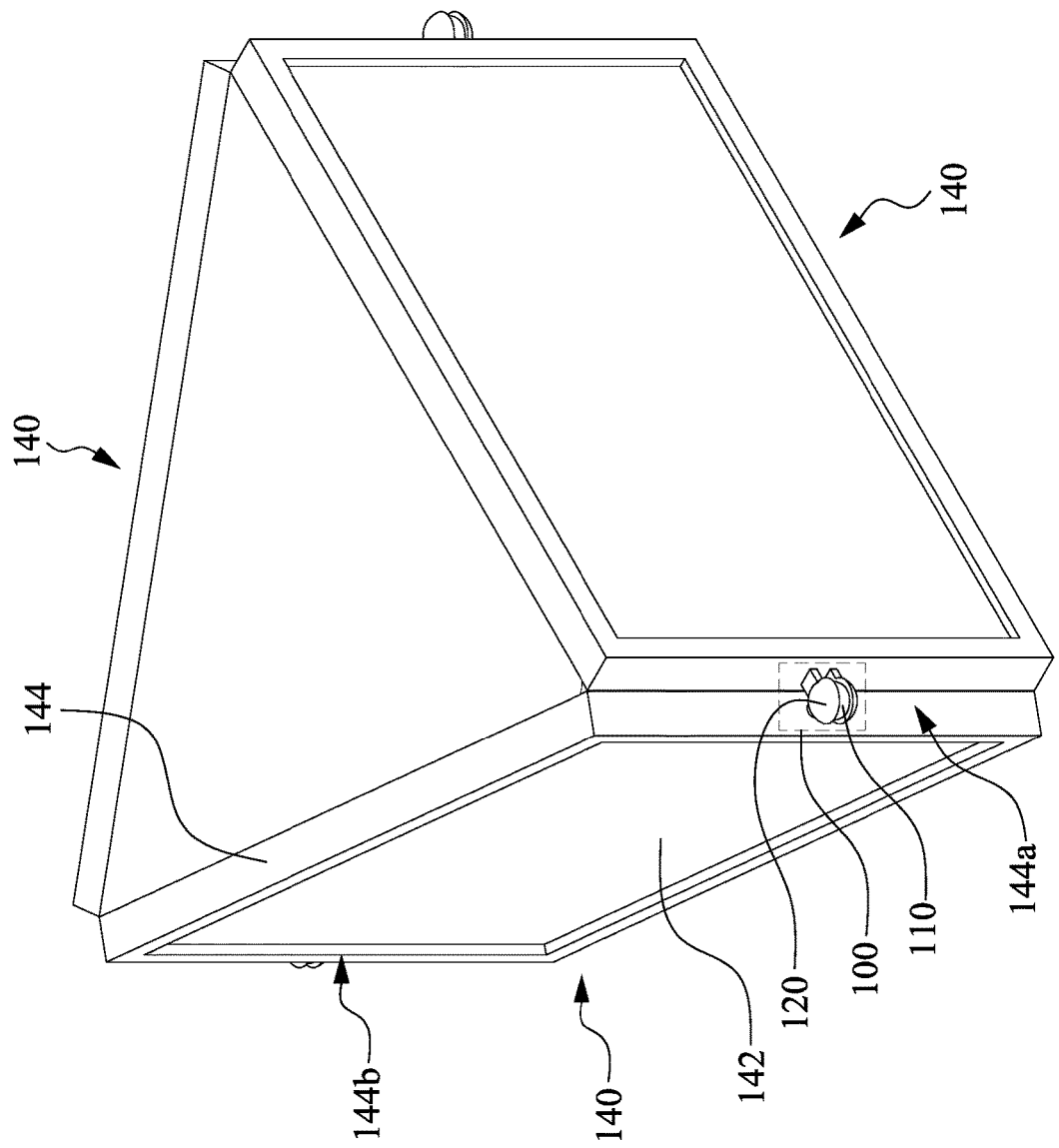

Another aspect of the present disclosure is to provide a display panel device having a connector structure. FIGS. 9 and 10 are perspective views of display panel devices having the connector structures 100 of the present disclosure. As shown in FIGS. 9 and 10, the display panel device includes a display panel 142, a frame 144, a first connector 110, and a second connector 120. Specifically, the frame 144 is configured to accommodate the display panel 142 to form the display 140 described above, in which the frame 144 has a first side 144a and second side 144b corresponding to each other. The first connector 110 is disposed at the first side 144a of the frame 144, and the second connector 120 is disposed at the second side 144b of the frame 144. Details of the first connector 110 and the second connector 120 may be referred to the foregoing and not described herein again. The two displays 140 can be connected with different rotational angles (e.g., the three displays 140 of FIG. 9 or the five displays 140 of FIG. 10) through the rotational connection between the first connector 110 and the second connector 120. In another embodiment, the two displays 140 are also flat connected through the connector structure 100 (not shown in the figures). It should be understood that the two displays 140 can be connected with different rotational angles or flat connected through the connector structure of other embodiments of the present disclosure (e.g., the connector structure 100a, 500, 600 or 600a).

The connector structure (e.g., the connector structure 100, 100a, 500, 600 or 600a) of the present disclosure may be disposed over a display. In other words, the display may include a first connector and a second connector. The display of the present disclosure may include an electrophoretic display, a cholesteric liquid crystal display, a plasma display, a microelectromechanical display, an electrowetting display, a liquid crystal display, an organic electroluminescent display, an inorganic electroluminescent display or an electrochromic display, or other suitable display.

Although the disclosure has been disclosed in the above embodiments, it is not intended to limit the disclosure. It is apparent to those skilled in the art that various alternations and modifications may be made without departing from the spirit and scope of the present disclosure, and the scope of the present disclosure is defined by the scope of the appended claims.

What is claimed is:

1. A connector structure, comprising:
a first connector comprising an insulating support, a first conductor, and a second conductor, the first and second conductors respectively disposed at two opposite sides of the insulating support, wherein the first and second conductors respectively have a first convex curved surface and a second convex curved surface, and the first and second convex curved surfaces protrude from the insulating support; and
a second connector configured to rotatably connect the first connector and comprising:
a first insulating housing and a second insulating housing respectively configured to cover at least a portion of the first conductor and at least a portion of the second conductor;
a first conductive layer disposed at an inner surface of the first insulating housing, the first conductive layer comprising a first concave curved surface matching the first convex curved surface, and configured to be in contact with the first conductor; and
a second conductive layer disposed at an inner surface of the second insulating housing, the second conductive layer comprising a second concave curved surface matching the second convex curved surface, and configured to be in contact with the second conductor.

2. The connector structure of claim 1, wherein the first and second conductors are elastically connected to the insulating support, so that the first and second conductors are able to be buried in the insulating support.

3. The connector structure of claim 1, wherein:
the first conductor comprises a first rounded body and a plurality of first curved bumps, and the first curved bumps protrude from the first rounded body; and
the second conductor comprises a second rounded body and a plurality of second curved bumps, and the second curved bumps protrude from the second rounded body.

4. The connector structure of claim 3, wherein:
the first concave curved surface comprises a first rounded curved surface and a plurality of first recesses, and the first recesses are recessed from the first rounded curved surface toward the first insulating housing; and
the second concave curved surface comprises a second rounded curved surface and a plurality of second recesses, and the second recesses are recessed from the second rounded curved surface toward the second insulating housing,
wherein the first rounded body and the first curved bumps are respectively configured to match the first rounded curved surface and the second recesses, and the second rounded body and the second curved bumps are respectively configured to match the second rounded curved surface and the second recesses.

5. The connector structure of claim 1, wherein the first connector further comprises a first wire and a second wire electrically connected to the first conductor and the second conductor, respectively; and
the second connector further comprises a third wire and a fourth wire electrically connected to the first conductive layer and the second conductive layer, respectively.

6. The connector structure of claim 5, wherein when the second connector rotatably connects the first connector, the first wire, the first conductor, the first conductive layer and the third wire form a first conductive path, and the second wire, the second conductor, the second conductive layer and the fourth wire form a second conductive path.

7. A connector structure, comprising:
a core connector, comprising:
a connector;
a rounded insulating core body disposed at one end of the connector;
a plurality of conductive bumps protruding from the rounded insulating core body; and
a plurality of first wires, each of the first wires connecting one of the conductive bumps from the connector through the rounded insulating core body; and
a housing connector configured to rotatably connect the core connector and comprising:
an insulating housing configured to cover at least a portion of the rounded insulating core body, and the insulating housing having an inner curved surface and a plurality of recesses formed over the inner curved surface;
a plurality of concave conductive members, each of the concave conductive members disposed in one of the recesses, and each of the concave conductive members has a concave surface, wherein the concave surfaces are configured to engage the conductive bumps; and
a plurality of second wires, each of the second wires connecting one of the concave conductive members.

8. A connector structure, comprising:
a first connector, comprising:
an insulating support having a first rounded recess and a second rounded recess respectively disposed at two opposite sides of the insulating support; and
a first conductive member and a second conductive member respectively disposed at the first rounded recess and the second rounded recess; and
a second connector configured to rotatably connect the first connector and comprising:
a first insulating support;
a first conductor disposed over the first insulating support and having a first rounded convex surface;
a second insulating support relative to the first insulating support; and
a second conductor disposed over the second insulating support and having a second rounded convex surface, wherein the first rounded convex surface is opposite to the second rounded convex surface,
wherein the first and second rounded convex surfaces are respectively configured to engage the first and second rounded recesses and to be in contact with the first and second conductive members.

9. The connector structure of claim 8, wherein the first connector further comprises a first wire and a second wire electrically connected to the first conductive member and the second conductive member, respectively; and
the second connector further comprises a third wire and a fourth wire electrically connected to the first conductor and the second conductor, respectively.

10. The connector structure of claim 9, wherein when the second connector rotatably connects the first connector, the first wire, the first conductive member, the first conductor and the third wire form a first conductive path, and the second wire, the second conductive member, the second conductor and the fourth wire form a second conductive path.

11. A display panel device having a connector structure, comprising:
- a display panel;
- a frame configured to accommodate the display panel, the frame having a first side and a second side corresponding to each other;
- a first connector disposed at the first side of the frame, the first connector comprising an insulating support, a first conductor and a second conductor, wherein the first and second conductors respectively have a first convex curved surface and a second convex curved surface; and
- a second connector disposed at the second side of the frame, and the second connector comprising:
  - an insulating housing,
  - a first conductive layer disposed at an inner surface of the insulating housing, and the first conductive layer comprising a first concave curved surface matching the first convex curved surface, and
  - a second conductive layer disposed at another inner surface of the insulating housing, and the second conductive layer comprising a second concave curved surface matching the second convex curved surface.

* * * * *